United States Patent
Nakanishi et al.

(10) Patent No.: US 6,551,743 B1
(45) Date of Patent: Apr. 22, 2003

(54) NONAQUEOUS SECONDARY BATTERY

(75) Inventors: Naoya Nakanishi, Tondabayashi (JP); Kouichi Satoh, Itami (JP); Kazuyasu Fujiwara, Sumoto (JP); Toshiyuki Nohma, Hirakata (JP); Ikuo Yonezu, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/534,241

(22) Filed: Mar. 23, 2000

(30) Foreign Application Priority Data

Mar. 24, 1999 (JP) .................................. 11-078997

(51) Int. Cl.[7] .................. H01M 4/50; H01M 4/52
(52) U.S. Cl. ............... 429/223; 429/224; 429/231.1; 429/231.2; 429/231.3; 429/231.5
(58) Field of Search .................. 429/223, 224, 429/231.1, 231.2, 231.3, 231.5

(56) References Cited

U.S. PATENT DOCUMENTS

| | | | |
|---|---|---|---|
| 5,514,496 A | * 5/1996 | Mishima et al. | 429/231.1 X |
| 5,561,006 A | 10/1996 | Lecerf et al. | 429/224 X |
| 5,620,812 A | * 4/1997 | Tahara et al. | 429/223 |
| 5,718,989 A | * 2/1998 | Aoki et al. | 429/223 X |
| 5,795,558 A | * 8/1998 | Aoki et al. | 429/223 X |
| 5,882,218 A | 3/1999 | Reimers | 429/224 |
| 5,948,565 A | * 9/1999 | Kelder | 429/231.1 X |
| 6,193,946 B1 | * 2/2001 | Kawano et al. | 423/594 |
| 6,274,278 B1 | * 8/2001 | Pistoia et al. | 429/231.1 |

FOREIGN PATENT DOCUMENTS

| JP | 6-295726 | * 10/1994 |
|---|---|---|
| JP | 9-270259 | * 10/1997 |
| JP | 11-016571 | * 1/1999 |
| JP | 11-073966 | * 3/1999 |

* cited by examiner

Primary Examiner—Stephen Kalafut
(74) Attorney, Agent, or Firm—Birch, Stewart, Kolasch & Birch, LLP

(57) ABSTRACT

In the nonaqueous secondary battery of this invention, a positive electrode includes, as an active material, a composite oxide represented by a composition formula, $Li_xMn_{2-y-z}Ni_yM_zO_q$, wherein M is at least one element selected from the group consisting of B, Mg, Al, Ti, V, Fe, Co, Cu, Zn, Ga, Y, Zr, Nb, Mo and In; $1.20 \leq x \leq 1.80$; $y \geq 0.10$; $z \geq 0$; $y+z \leq 1.90$; and $3.70 \leq q \leq 4.30$, in a discharge state during fabrication of the nonaqueous secondary battery. As a result, the nonaqueous secondary battery can exhibit good charge-discharge cycle performance and can be fabricated at low cost.

5 Claims, 1 Drawing Sheet

NONAQUEOUS SECONDARY BATTERY

BACKGROUND OF THE INVENTION

This application claims the Paris convention priority of Japanese Patent Application No. 11-078997/1999 filed on Mar. 24, 1999, which is incorporated herein by reference.

The present invention relates to a nonaqueous secondary battery requiring charge before initial discharge, and more particularly, it relates to improvement of a positive electrode active material for the purpose of improving the charge-discharge cycle performance of such a nonaqueous secondary battery.

Known positive electrode active materials for a nonaqueous secondary battery are lithium cobaltate ($LiCoO_2$), lithium nickelate ($LiNiO_2$), a lithium-cobalt-nickel composite oxide ($LiCo_{1-x}Ni_xO_2$, wherein 0<x<1), and a composite oxide obtained by substituting another element for a part of cobalt or nickel of such a compound. When any of these positive electrode active materials is used together with a negative electrode material such as metallic lithium, lithium alloy and a carbon material, a nonaqueous secondary battery having a high voltage and a high energy density can be obtained.

The materials for these positive electrode active materials are, however, rare resources and expensive, which disadvantageously increases the fabrication cost for the battery.

Recently, a lithium-manganese composite oxide, such as a spinel lithium-manganese composite oxide ($LiMn_2O_4$) and an orthorhombic lithium-manganese composite oxide ($LiMnO_2$), has attracted attention as an inexpensive positive electrode active material for a nonaqueous secondary battery, which is made from manganese, that is, an abundant resource, instead of expensive cobalt and nickel.

A lithium-manganese composite oxide, however, is degraded during repeated charge and discharge cycles due to elution of manganese, resulting in decreasing the discharge capacity in a small number of cycles. Therefore, even when the lithium-manganese composite oxide itself is used as a positive electrode active material, the resultant nonaqueous secondary battery cannot attain good charge-discharge cycle performance.

Accordingly, an object of the invention is providing a nonaqueous secondary battery that can be fabricated at lower cost than a nonaqueous secondary battery using an expensive material such as lithium cobaltate as a positive electrode active material and can attain better charge-discharge cycle performance than a nonaqueous secondary battery using a lithium-manganese composite oxide as a positive electrode active material. This object is achieved by using a specific composite oxide as a positive electrode active material as described in detail below.

SUMMARY OF THE INVENTION

The nonaqueous secondary battery of this invention (present battery) requiring charge before initial discharge comprises a positive electrode, a negative electrode and a nonaqueous electrolyte, and the positive electrode includes, as an active material, a composite oxide represented by a composition formula, $Li_xMn_{2-y-z}Ni_yM_zO_q$, wherein M is at least one element selected from the group consisting of B, Mg, Al, Ti, V, Fe, Co, Cu, Zn, Ga, Y, Zr, Nb, Mo and In; $1.20 \leq x \leq 1.80$; $y \geq 0.10$; $z \geq 0$; $y+z \leq 1.90$; and $3.70 \leq q \leq 4.30$, in a discharge state during fabrication of the battery.

By using this composite oxide as the positive electrode active material, the nonaqueous secondary battery of this invention can attain good charge-discharge cycle performance and can be fabricated at low cost.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawing, wherein.

DETAILED DESCRIPTION OF THE INVENTION

Figure 1:
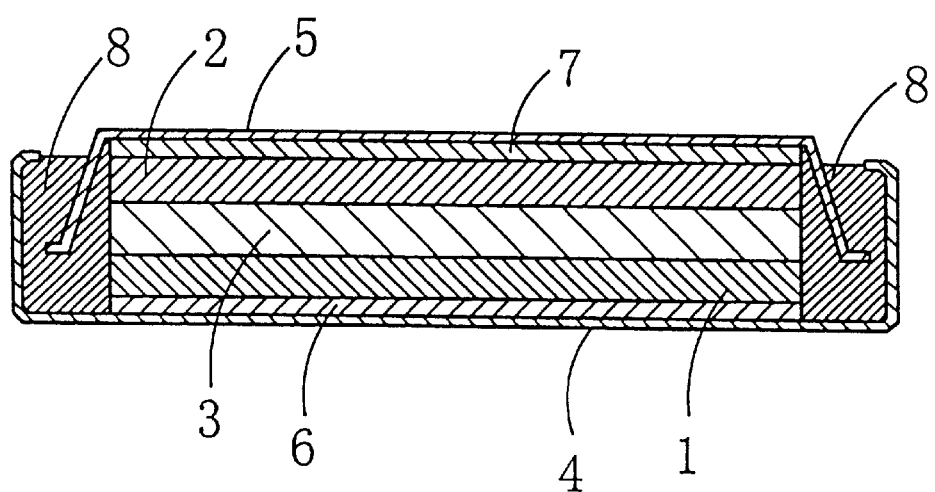
FIG. 1 is a sectional view of a nonaqueous secondary battery fabricated in an embodiment.

The present battery comprises a positive electrode, a negative electrode and a nonaqueous electrolyte, and the positive electrode includes, as an active material, a composite oxide represented by a composition formula, $Li_xMn_{2-y-z}Ni_yM_zO_q$, wherein M is at least one element selected from the group consisting of B, Mg, Al, Ti, V, Fe, Co, Cu, Zn, Ga, Y, Zr, Nb, Mo and In; $1.20 \leq x \leq 1.80$; $y \geq 0.10$; $z \geq 0$; $y+z \leq 1.90$; and $3.70 \leq q \leq 4.30$, in a discharge state during fabrication of the battery.

The present battery exhibits good charge-discharge cycle performance with minimal decrease of the discharge capacity during charge-discharge cycles. This is probably because elution of manganese into the nonaqueous electrolyte during charge-discharge cycles is suppressed by substituting nickel, and the specific element M if necessary, each in a predetermined amount for a part of manganese.

In the composition formula, x should be 1.20 through 1.80, y should be 0.10 or more and q should be 3.70 through 4.30 because the charge-discharge cycle performance is degraded when each of them falls out of the specified range. Furthermore, x is preferably 1.30 through 1.70 and more preferably 1.40 through 1.60; y is preferably 0.10 through 1.50 and more preferably 0.20 through 1.00; and z is preferably 0 through 0.20.

One kind of composite oxide can be singly used or two or more kinds can be used together if necessary.

The composite oxide can be synthesized, for example, by dissolving a mixture of nitrate, acetate or carbonate of constituent metals in a solvent such as water and ethanol, adding alkali to the resultant solution to give a precipitate, and baking the precipitate in an oxygen atmosphere in a predetermined concentration. The ratio between the constituent metals (i.e., x, y and z) in the resultant composite oxide can be adjusted by adjusting the atomic ratio between the constituent metals to be mixed in the synthesis. Also, the oxidation level (i.e., q) of the resultant composite oxide can be adjusted by adjusting the oxygen concentration (oxygen partial pressure) and the like adopted in the synthesis.

The present invention is characterized by using, as the positive electrode active material, the specific manganese-containing composite oxide from which manganese is minimally eluted during charge-discharge cycles for the purpose of improving the charge-discharge cycle performance. Therefore, the other members used in the battery such as the negative electrode material and the nonaqueous electrolyte can be prepared from any materials conventionally known as the materials for a nonaqueous secondary battery.

Examples of the negative electrode material are metallic lithium; lithium alloy such as lithium-aluminum alloy, lithium-lead alloy and lithium-tin alloy; a carbon material such as graphite, coke and an organic baked substance; and a metal oxide, such as $SnO_2$, SnO, $TiO_2$ and $Nb_2O_5$, having a base potential as compared with the potential of the positive electrode active material. Furthermore, examples of a solvent of the nonaqueous electrolyte are a cyclic carbonic ester, such as ethylene carbonate, propylene carbonate, vinylene carbonate and butylene carbonate; and a mixed solvent including a cyclic carbonic ester and a solvent having a low boiling point, such as dimethyl carbonate, diethyl carbonate, methylethyl carbonate, 1,2-diethoxyethane, 1,2-dimethoxyethane and ethoxymethoxyethane. Examples of a solute of the nonaqueous electrolyte are $LiPF_6$, $LiBF_4$, $LiClO_4$, $LiCF_3SO_3$, $LiSbF_6$, $LiAsF_6$, $LiN(CF_3SO_2)_2$, $LiN(C_2F_5SO_2)_2$, $LiN(CF_3SO_2)(C_4F_9SO_2)$, $LiC(CF_3SO_2)_3$ and $LiC(C_2F_5SO_2)_3$. One of these lithium salts can be singly used or two or more of them can be used together if necessary.

EMBODIMENTS

Other features of the invention will become more apparent in the course of the following descriptions of exemplary embodiments which are given for illustration of the invention and not intended to be limiting thereof.

Experiment 1

Present batteries and comparative batteries were fabricated so as to compare the charge-discharge cycle performance.

Fabrication of Present Batteries A1 through A7 and Comparative Batteries B1 through B6:

Preparation of Positive Electrodes

Lithium nitrate, manganese acetate, nickel nitrate and cobalt carbonate were mixed in an atomic ratio between lithium, manganese, nickel and cobalt of x:(2−y−z):y:z, the resultant mixture was poured into ethyl alcohol with vigorous stirring, and 40% aqueous ammonia was added thereto to give a precipitate. The precipitate was then filtered, baked in the air at 850° C. for 24 hours, and crushed with a jet mill. Thus, eleven kinds of composite oxides each with an average particle size of 15 μm were synthesized. Table 1 below shows x, 2−y−z, y, z and q of the composite oxides.

Each of the composite oxides serving as a positive electrode active material, acetylene black serving as a conductive agent and poly(vinylidene fluoride) serving as a binder were kneaded in a weight ratio of 90:6:4, thereby preparing a positive electrode mixed material. The positive electrode mixed material was pressed at a molding pressure of 2 ton/cm² into a disk with a diameter of 20 mm, and the resultant disk was heated at 250° C. under vacuum for 2 hours. Thus, eleven kinds of positive electrodes were prepared.

Also, another two kinds of positive electrodes were prepared in the same manner as described above except that $LiMn_2O_4$ and $LiMnO_2$ were respectively used instead of the composite oxides as the positive electrode active material.

Preparation of Negative Electrode

A negative electrode was prepared by punching a rolled sheet of lithium-aluminum alloy into a disk with a diameter of 20 mm.

Preparation of Nonaqueous Electrolyte

A nonaqueous electrolyte was prepared by dissolving $LiPF_6$ in a concentration of 1 mol/liter in a mixed solvent including ethylene carbonate, dimethyl carbonate and ethylmethyl carbonate in a volume ratio of 1:2:1.

Fabrication of Nonaqueous Secondary Batteries

Coin type nonaqueous secondary batteries A1 through A7 and B1 through B6 were fabricated by using the positive electrodes, the negative electrode and the nonaqueous electrolyte prepared as described above. In each battery, the capacity ratio between the positive electrode and the negative electrode was set to 1:1.1. Also, a polypropylene film with ionic permeability was used as a separator. The batteries A1 through A7 are the present batteries, and the batteries B1 through B6 are comparative batteries. FIG. 1 is a sectional view of the nonaqueous secondary battery thus fabricated. The nonaqueous secondary battery A of FIG. 1 comprises a positive electrode 1, a negative electrode 2, a separator 3 for separating these electrodes, a positive electrode can 4, a negative electrode can 5, a positive electrode collector 6, a negative electrode collector 7, an insulating packing 8 of polypropylene, and the like. The positive electrode 1 and the negative electrode 2 opposing each other with the separator 3 impregnated with the nonaqueous electrolyte sandwiched therebetween are housed in a battery can formed by the positive electrode can 4 and the negative electrode can 5. The positive electrode 1 is connected to the positive electrode can 4 through the positive electrode collector 6, and the negative electrode 2 is connected to the negative electrode can 5 through the negative electrode collector 7, so that chemical energy generated within the battery can can be taken out as electric energy.

Charge-discharge Cycle Performance

With respect to each of the batteries, 20 cycles were run in each cycle of which the battery was charged to 4.3 V at a current density of 0.15 mA/cm² and discharged to 3.0 V at a current density of 0.15 mA/cm², so as to obtain a capacity retention ratio at the 20th cycle defined by a formula below. The obtained capacity retention ratios are shown in Table 1.

Capacity retention ratio=(Discharge capacity at 20th cycle/Discharge capacity at 1st cycle)×100

TABLE 1

| Battery | $Li_xMn_{2-y-z}Ni_yCo_zO_q$ | | | | | Capacity retention ratio (%) |
| --- | --- | --- | --- | --- | --- | --- |
| | x | 2−y−z | y | z | q | |
| B1 | 1.00 | 1.35 | 0.50 | 0.15 | 4.00 | 95.3 |
| B2 | 1.10 | 1.35 | 0.50 | 0.15 | 4.00 | 96.0 |
| A1 | 1.20 | 1.35 | 0.50 | 0.15 | 4.00 | 97.3 |
| A2 | 1.30 | 1.35 | 0.50 | 0.15 | 4.00 | 98.0 |
| A3 | 1.40 | 1.35 | 0.50 | 0.15 | 4.00 | 98.5 |
| A4 | 1.50 | 1.35 | 0.50 | 0.15 | 4.00 | 98.7 |
| A5 | 1.60 | 1.35 | 0.50 | 0.15 | 4.00 | 98.5 |
| A6 | 1.70 | 1.35 | 0.50 | 0.15 | 4.00 | 98.0 |
| A7 | 1.80 | 1.35 | 0.50 | 0.15 | 4.00 | 97.3 |
| B3 | 1.90 | 1.35 | 0.50 | 0.15 | 4.00 | 96.2 |
| B4 | 2.00 | 1.35 | 0.50 | 0.15 | 4.00 | 95.1 |
| B5 | $LiMn_2O_4$ | | | | | 94.0 |
| B6 | $LiMnO_2$ | | | | | 94.7 |

As is shown in Table 1, the present batteries A1 through A 7 have larger capacity retention ratios and exhibit better charge-discharge cycle performance than the comparative batteries B1 through B4. It is understood from this result that x in the composition formula, $Li_xMn_{2-y-z}Ni_yCo_zO_q$, of the composite oxide should be 1.20 through 1.80 in order to obtain a nonaqueous secondary battery exhibiting good charge-discharge cycle performance. Also, among the present batteries, the capacity retention ratio is large in the batteries A2 through A6 and is very large in the batteries A3 through A5. This reveals that x in the composition formula of the composite oxide is preferably 1.30 through 1.70 and more preferably 1.40 through 1.60. It was also confirmed that regardless of the kind of substituent element M for manganese, x in the composition formula, $Li_xMn_{2-y-z}Ni_yM_zO_q$, of the composite oxide is preferably 1.30 through 1.70 and more preferably 1.40 through 1.60. The comparative batteries B5 and B6, that is, conventional batteries, have small capacity retention ratios because manganese was eluted in a large amount during the charge-discharge cycles.

Experiment 2

The relationship between y in the composition formula, $Li_xMn_{2-y-z}Ni_yCO_zO_q$, and the charge-discharge cycle performance was examined.

Six kinds of composite oxides each with an average particle size of 15 μm were synthesized in the same manner as in Experiment 1 except that the mixing ratio between lithium nitrate, manganese acetate, nickel nitrate and cobalt carbonate was varied. Table 2 below shows x, 2-y-z, y, z and q of these composite oxides. Present batteries A8 through A12 and a comparative battery B7 were fabricated in the same manner as in Experiment 1 except that these composite oxides were respectively used as the positive electrode active material. Each of the batteries was subjected to the charge-discharge cycle test under the same conditions as in Experiment 1, so as to obtain the capacity retention ratio at the 20th cycle. The obtained capacity retention ratios are shown in Table 2, in which the capacity retention ratio of the present battery A4 listed in Table 1 is also shown.

TABLE 2

| Battery | $Li_xMn_{2-y-z}Ni_yCo_zO_q$ | | | | | Capacity retention ratio |
|---|---|---|---|---|---|---|
| | x | 2-y-z | y | z | q | (%) |
| B7 | 1.50 | 1.85 | 0.00 | 0.15 | 4.00 | 95.5 |
| A8 | 1.50 | 1.75 | 0.10 | 0.15 | 4.00 | 97.9 |
| A9 | 1.50 | 1.65 | 0.20 | 0.15 | 4.00 | 98.4 |
| A4 | 1.50 | 1.35 | 0.50 | 0.15 | 4.00 | 98.7 |
| A10 | 1.50 | 0.85 | 1.00 | 0.15 | 4.00 | 98.5 |
| A11 | 1.50 | 0.35 | 1.50 | 0.15 | 4.00 | 98.0 |
| A12 | 1.50 | 0.10 | 1.75 | 0.15 | 4.00 | 97.2 |

As is shown in Table 2, the present batteries A4 and A8 through A12 have larger capacity retention ratios and exhibit better charge-discharge cycle performance than the comparative battery B7. It is understood from this result that y in the composition formula, $Li_xMn_{2-y-z}Ni_yCo_zO_q$, of the composite oxide should be 0.10 or more in order to largely improve the charge-discharge cycle performance. Also, among the present batteries, the capacity retention ratio is large in the batteries A4 and A8 through A11 and is very large in the batteries A4, A9 and A10. This reveals that y in the composition formula of the composite oxide is preferably 0.10 through 1.50 and more preferably 0.20 through 1.00. It was also confirmed that regardless of the kind of substituent element M for manganese, y in the composition formula, $Li_xMn_{2-y-z}Ni_yM_zO_q$, of the composite oxide is preferably 0.10 through 1.50 and more preferably 0.20 through 1.00.

Experiment 3

The relationship between z in the composition formula, $Li_xMn_{2-y-z}Ni_yCo_zO_q$, and the charge-discharge cycle performance was examined.

Five kinds of composite oxides each with an average particle size of 15 μm were synthesized in the same manner as in Experiment 1 except that the mixing ratio between lithium nitrate, manganese acetate, nickel nitrate and cobalt carbonate was varied. Table 3 below shows x, 2-y-z, y, z and q of these composite oxides. Present batteries A13 through A17 were fabricated in the same manner as in Experiment 1 except that these composite oxides were respectively used as the positive electrode active material. Each of the batteries was subjected to the charge-discharge cycle test under the same conditions as in Experiment 1, so as to obtain the capacity retention ratio at the 20th cycle. The obtained capacity retention ratios are shown in Table 3, in which the capacity retention ratio of the present battery A4 listed in Table 1 is also shown.

TABLE 3

| Battery | $Li_xMn_{2-y-z}Ni_yCo_zO_q$ | | | | | Capacity retention ratio |
|---|---|---|---|---|---|---|
| | x | 2-y-z | y | z | q | (%) |
| A13 | 1.50 | 1.50 | 0.50 | 0.00 | 4.00 | 98.5 |
| A4 | 1.50 | 1.35 | 0.50 | 0.15 | 4.00 | 98.7 |
| A14 | 1.50 | 1.30 | 0.50 | 0.20 | 4.00 | 98.5 |
| A15 | 1.50 | 1.00 | 0.50 | 0.50 | 4.00 | 98.0 |
| A16 | 1.50 | 0.50 | 0.50 | 1.00 | 4.00 | 97.6 |
| A17 | 1.50 | 0.10 | 0.50 | 1.40 | 4.00 | 97.2 |

As is shown in Table 3, the present batteries A4 and A13 through A17 have larger capacity retention ratios and exhibit better charge-discharge cycle performance than the comparative batteries B5 and B6 shown in Table 1. Also, among the present batteries, the capacity retention ratio is large in the batteries A4, A13 and A14. This reveals that z in the composition formula of the composite oxide is preferably 0 through 0.20. It was also confirmed that regardless of the kind of substituent element M for manganese, z in the composition formula, $Li_xMn_{2-y-z}Ni_yM_zO_q$, of the composite oxide is preferably 0 through 0.20.

Experiment 4

The relationship between q in the composition formula, $Li_xMn_{2-y-z}Ni_yCo_zO_q$, and the charge-discharge cycle performance was examined.

Lithium nitrate, manganese acetate, nickel nitrate and cobalt carbonate were mixed in an atomic ratio between lithium, manganese, nickel and cobalt of 1.5:1.35:0.50:0.15. The resultant mixture was baked at 850° C. for 24 hours in an atmosphere of an oxygen partial pressure of 0.02 atm, 0.1 atm, 0.5 atm or 0.8 atm (with nitrogen used for balance). Thus, four kinds of composite oxides each having an average particle size of 15 μm and respectively having different oxidation levels were synthesized. Table 4 below shows x, 2-y-z, y, z and q of theses composite oxides. Present batteries A18 (oxygen partial pressure: 0.5 atm) and A19 (oxygen partial pressure: 0.1 atm) and comparative batteries B8 (oxygen partial pressure: 0.8 atm) and B9 (oxygen partial pressure: 0.02 atm) were fabricated in the same manner as in Experiment 1 except that these composite oxides were used as the positive electrode active material. Each of the batteries was subjected to the charge-discharge cycle test under the same conditions as in Experiment 1, so as to obtain the capacity retention ratio at the 20th cycle. The obtained capacity retention ratios are shown in Table 4.

TABLE 4

| Battery | $Li_xMn_{2-y-z}Ni_yCo_zO_q$ | | | | Capacity retention ratio (%) |
|---|---|---|---|---|---|
| | x | 2-y-z | y | z | q | |
| B8  | 1.50 | 1.35 | 0.50 | 0.15 | 4.50 | 94.5 |
| A18 | 1.50 | 1.35 | 0.50 | 0.15 | 4.30 | 97.8 |
| A19 | 1.50 | 1.35 | 0.50 | 0.15 | 3.70 | 97.9 |
| B9  | 1.50 | 1.35 | 0.50 | 0.15 | 3.50 | 94.3 |

It is understood from Table 4 that q in the composition formula, $Li_xMn_{2-y-z}Ni_yCo_zO_q$, of the composite oxide should be 3.70 through 4.30 in order to obtain a nonaqueous secondary battery exhibiting good charge-discharge cycle performance. It was also confirmed that regardless of the kind of substituent element M for manganese, q in the composition formula, $Li_xMn_{2-y-z}Ni_yM_zO_q$, of the composite oxide should be 3.70 through 4.30.

Experiment 5

Lithium nitrate, manganese acetate, nickel nitrate and a material for each substituent element M listed in Table 5 were mixed in an atomic ratio between lithium, manganese, nickel and the element M of 1.50:1.35:0.50:0.15, the resultant mixture was poured into ethyl alcohol with vigorous stirring, and 40% aqueous ammonia was added thereto to give a precipitate. The precipitate was filtered, baked in the air at 850° C. for 24 hours, and crushed with a jet mill, thereby synthesizing fourteen kinds of composite oxides each with an average particle size of 15 μm represented by a composition formula, $Li_{1.50}Mn_{1.35}Ni_{0.50}M_{0.15}O_{4.00}$, wherein M is B, Mg, Al, Ti, V, Fe, Cu, Zn, Ga, Y, Zr, Nb, Mo or In.

Present batteries A20 through A33 were fabricated in the same manner as in Experiment 1 except that these composite oxides were respectively used as the positive electrode active material. Each of the batteries was subjected to the charge-discharge cycle test under the same conditions as in Experiment 1, so as to obtain the capacity retention ratio at the 20th cycle. The obtained capacity retention ratios are shown in Table 5, in which the capacity retention ratio of the present battery A4 listed in Table 1 is also shown.

TABLE 5

| Battery | Substituent element M | Material for substituting element M | Capacity retention ratio (%) |
|---|---|---|---|
| A20 | B  | $B_2O_3$    | 98.5 |
| A21 | Mg | $MgCl_2$    | 98.6 |
| A22 | Al | $Al(OH)_3$  | 98.4 |
| A23 | Ti | $Ti_2O_3$   | 98.4 |
| A24 | V  | $VCl_2$     | 98.5 |
| A25 | Fe | $Fe(OH)_2$  | 98.6 |
| A4  | Co | $CoCO_3$    | 98.7 |
| A26 | Cu | $CuCl$      | 98.6 |
| A27 | Zn | $Zn(OH)_2$  | 98.5 |
| A28 | Ga | $Ga(OH)_3$  | 98.4 |
| A29 | Y  | $Y_2O_3$    | 98.2 |
| A30 | Zr | $Zr(NO_3)_4$| 98.4 |
| A31 | Nb | $NbCl_5$    | 98.3 |
| A32 | Mo | $MoCl_2$    | 98.5 |
| A33 | In | $InCl$      | 98.6 |

It is understood from Table 5 that a nonaqueous secondary battery exhibiting good charge-discharge cycle performance can be similarly obtained even when another substituent element M is used instead of cobalt.

Although the present invention is applied to a coin type nonaqueous secondary battery in the aforementioned embodiments, the invention is not limited in the shape of batteries but is applicable to nonaqueous secondary batteries in various shapes including a cylindrical shape.

Obviously, numerous modifications and variations of the present invention are possible in light of the above teachings. It is therefore to be understood that within the scope of the appended claims the invention may be practiced otherwise than as specifically described herein.

What is claimed is:

1. A nonaqueous secondary battery requiring charge before initial discharge comprising a positive electrode, a negative electrode and a nonaqueous electrolyte, the positive electrode including, as an active material, a composite oxide represented by a composition formula, $Li_xMn_{2-y-z}Ni_yM_zO_q$, wherein M is at least one element selected from the group consisting of B, Mg, Al, Ti, V, Fe, Co, Cu, Zn, Ga, Y, Zr, Nb, Mo and In; $1.20 \leq x \leq 1.80$; $0.10 \leq y \leq 1.50$; $z > 0$; $y+z \leq 1.90$; and $3.70 \leq q \leq 4.30$, in a discharge state during fabrication of the nonaqueous secondary battery.

2. The nonaqueous secondary battery according to claim 1, wherein $1.30 \leq x \leq 1.70$.

3. The nonaqueous secondary battery according to claim 1, wherein $1.40 \leq x \leq 1.60$.

4. The nonaqueous secondary battery according to claim 1, wherein $0.20 \leq y \leq 1.00$.

5. The nonaqueous secondary battery according to claim 1, wherein $0 \leq z \leq 0.20$.

* * * * *